United States Patent
Liu et al.

(10) Patent No.: US 9,680,819 B2
(45) Date of Patent: Jun. 13, 2017

(54) METHOD AND SYSTEM FOR CO-TERMINATION OF DIGITAL CERTIFICATES

(75) Inventors: Quentin Liu, San Jose, CA (US); Kathleen Barnes, Santa Clara, CA (US); Richard F. Andrews, Menlo Park, CA (US)

(73) Assignee: Symantec Corporation, Mountain View, CA (US)

( * ) Notice: Subject to any disclaimer, the term of this patent is extended or adjusted under 35 U.S.C. 154(b) by 1146 days.

(21) Appl. No.: 12/646,834

(22) Filed: Dec. 23, 2009

(65) Prior Publication Data

US 2011/0154027 A1 Jun. 23, 2011

(51) Int. Cl.
*H04L 29/06* (2006.01)
*H04L 9/32* (2006.01)

(52) U.S. Cl.
CPC ........ *H04L 63/0823* (2013.01); *H04L 9/3263* (2013.01); *H04L 2209/56* (2013.01)

(58) Field of Classification Search
CPC .......................... H04L 9/2363; G06Q 20/3674
USPC ................................. 713/156–158, 173, 175
See application file for complete search history.

(56) References Cited

U.S. PATENT DOCUMENTS

| | | | | |
|---|---|---|---|---|
| 7,971,261 B2* | 6/2011 | Pestoni | ............................ | 726/27 |
| 8,538,893 B1* | 9/2013 | Moses | ............................. | 705/75 |
| 2002/0108042 A1 | 8/2002 | Oka et al. | | |
| 2003/0126431 A1 | 7/2003 | Beattie et al. | | |
| 2004/0171369 A1* | 9/2004 | Little et al. | ................... | 455/410 |
| 2004/0177246 A1 | 9/2004 | Balaz et al. | | |
| 2005/0055548 A1* | 3/2005 | Micali | .......................... | 713/158 |
| 2005/0114653 A1 | 5/2005 | Sudia | | |
| 2005/0287990 A1 | 12/2005 | Mononen et al. | | |

(Continued)

FOREIGN PATENT DOCUMENTS

JP 2008-042753 2/2008

OTHER PUBLICATIONS

"Public key certificate"—Wikipedia Entry, retrieved from the Internet: <<http://en.wikipedia.org/wiki/Public_key_certificate>>, 5 pages total.

(Continued)

*Primary Examiner* — Joseph P Hirl
*Assistant Examiner* — Leynna Truvan
(74) *Attorney, Agent, or Firm* — Wilmer Cutler Pickering Hale and Dorr LLP

(57) ABSTRACT

A method of renewing a plurality of digital certificates includes receiving, at a first time, a request from a user to renew a first digital certificate and determining an expiration date for the first digital certificate. The method also includes receiving, at a second time, a request from the user to renew a second digital certificate and determining an expiration date for the second digital certificate. The expiration date for the second certificate is later than the expiration date for the first certificate. The method further includes determining a new expiration date occurring after the first time and the second time and renewing the first digital certificate. An expiration date for the renewed first digital certificate is equal to the new expiration date. Moreover, the method includes renewing the second digital certificate. An expiration date for the renewed second digital certificate is equal to the new expiration date.

16 Claims, 7 Drawing Sheets

(56) References Cited

U.S. PATENT DOCUMENTS

| | | | |
|---|---|---|---|
| 2006/0129804 | A1 | 6/2006 | Satkunanathan et al. |
| 2006/0265508 | A1 | 11/2006 | Angel et al. |
| 2007/0101125 | A1 | 5/2007 | Lain et al. |
| 2008/0209208 | A1 | 8/2008 | Parkinson |
| 2008/0215468 | A1* | 9/2008 | Monsa-Chermon et al. .. 705/34 |
| 2008/0228651 | A1 | 9/2008 | Tapsell |
| 2008/0320569 | A1* | 12/2008 | Parkinson .................. 726/6 |
| 2009/0092247 | A1 | 4/2009 | Kido et al. |
| 2009/0132812 | A1 | 5/2009 | Kobozev et al. |
| 2009/0313467 | A1* | 12/2009 | Atkins et al. ............. 713/155 |
| 2011/0087881 | A1* | 4/2011 | Howcroft et al. .......... 713/156 |
| 2011/0113239 | A1* | 5/2011 | Fu et al. .................... 713/156 |

OTHER PUBLICATIONS

"Using Subject Altname," [Online Discussion Board], retrieved from the Internet: <<http://www.issociate.de/board/22008/Using_subjectAltName.html>>, 3 pages.

Cooper et al., RFC 5280—"Internet X.509 Public Key Infrastructure Certificate and Certificate Revocation List (CRL) Profile" The IETF Trust (2008), retrieved from the Internet: <<http://www.ietf.org/rfc/rfc5280.txt>>, 141 pages.

Helm and Mugaratham, "SubjectAltNames in X.509 Certificates," version 8, Aug. 2004, retrieved from the Internet: <<http://www.es.net/pub/esnet-doc/SubjectAltName.pdf>>, 6 pages total.

* cited by examiner

METHOD AND SYSTEM FOR CO-TERMINATION OF DIGITAL CERTIFICATES

BACKGROUND OF THE INVENTION

X.509 certificates, also referred to as public key certificates, digital certificates, or certificates, are used in a wide variety of applications. These digital certificates provide a method to verify the identity of an organization, are a component of a secure communications channel, and deliver authorization information based on these capabilities. As utilized on the Internet, the certificate is an electronic document that uses a digital signature to bind a public key to an identity. Information such as the name of an organization, their address, are included in the certificate. In a public key infrastructure (PKI) system, the digital signature is provided by a Certificate Authority (CA) that issues the certificate. The signatures on a certificate are attestations by the certificate signer that the identity information and the public key belong together.

A common use of certificates is for https-based web sites. When a user accesses an https-based site, the browser validates that an SSL web server is authentic, providing the user with the confidence that the interactions with the web site will be secure, for example, that the web site is authentic and that their data transactions are encrypted. In order to obtain a digital certificate, a web site operator applies to a CA using a certificate signing request (CSR). The certificate request is an electronic document that contains the web site name, contact email address, company information, and other information. The CA digitally signs the public key from the request, thus producing a public certificate. This public certificate is served to any browser that connects to the web site and provides validation to the browser that the provider believes it has issued a certificate to the owner of the web site. Before issuing a digital certificate, the CA will execute rigorous processes to authenticate and verify the identity of the requester.

X.509 certificates are defined by the Telecommunication Standardization Sector (ITU-T) of the International Telecommunication Union (ITU) as part of the Directory (X.500) series. Additional description related to the structure of X.509 digital certificates may be found in RFC 5280, which is located at http://www.ietf.org/rfc/rfc5280.txt.

The structure of an X.509 v3 digital certificate is as follows:
  Certificate
    Version
    Serial Number
    Algorithm ID
    Issuer
    Validity
      notBefore
      notAfter
    Subject
    Subject Public Key Info
      Public Key Algorithm
      Subject Public Key
    Issuer Unique Identifier (Optional)
    Subject Unique Identifier (Optional)
    Extensions (Optional)
      . . .
  Certificate Signature Algorithm
  Certificate Signature Certificates are issued by a Certificate Authority (CA), for example, the present assignee. The certificate validity period is the time interval during which the CA warrants that it will maintain information about the status of the certificate. The field is represented as a SEQUENCE of two dates: the date on which the certificate validity period begins (notBefore); and the date on which the certificate validity period ends (notAfter). Both notBefore and notAfter may be encoded as UTCTime or GeneralizedTime.

Pursuant to RFC 5280, CAs encode certificate validity dates through the year 2049 as UTCTime. Certificate validity dates in 2050 or later are encoded as GeneralizedTime. Conforming applications are able to process validity dates that are encoded in either UTCTime or GeneralizedTime. The validity period for a certificate is the period of time from notBefore through notAfter, inclusive. Both notBefore and notAfter may be encoded as UTCTime or GeneralizedTime.

Despite the benefits available through the use of digital certificates, there is a need in the art for improved methods and systems related to the use of digital certificates.

SUMMARY OF THE INVENTION

The present invention relates generally to computer networks. More specifically, the present invention relates to methods and systems for managing digital certificates. Merely by way of example, the invention has been applied to a method of modifying validity end dates for digital certificates in order to increase certificate flexibility. In a particular embodiment, validity dates for a set of certificates managed by a user are adjusted to have a common validity end date. Subsequent renewals of the set of certificates will result in certificates with common validity end dates. The methods and techniques can be applied to a variety of computer networks and communications systems.

According to an embodiment of the present invention, a method of renewing a plurality of digital certificates is provided. The method includes receiving, at a first time, a request from a user to renew a first digital certificate of the plurality of digital certificates and determining an expiration date for the first digital certificate. The method also includes receiving, at a second time, a request from the user to renew a second digital certificate of the plurality of digital certificates and determining an expiration date for the second digital certificate. The expiration date for the second certificate is later than the expiration date for the first certificate. The method further includes determining a new expiration date occurring after the first time and the second time and renewing the first digital certificate. An expiration date for the renewed first digital certificate is equal to the new expiration date. Moreover, the method includes renewing the second digital certificate. An expiration date for the renewed second digital certificate is equal to the new expiration date.

According to another embodiment of the present invention, a method of renewing multiple digital certificates is provided. The method includes receiving a request from a user to renew a first digital certificate having a first expiration date and receiving a request from the user to renew a second digital certificate having a second expiration date later than the first expiration date. The method also includes renewing the first digital certificate with a first new expiration date and renewing the second digital certificate with a second new expiration date. A difference between the first expiration date and the second expiration date is greater than a difference between the first new expiration date and the second new expiration date.

According to a particular embodiment of the present invention, a method of provisioning a digital certificate is provided. The method includes receiving a request from a user to provision the digital certificate and determining that the user is associated with a second digital certificate. The method also includes determining an expiration date for the second digital certificate and provisioning the digital certificate with an expiration date substantially equal to the expiration date of the second digital certificate.

According to another particular embodiment of the present invention, a method of provisioning a digital certificate is provided. The method includes receiving a request from a user to provision the digital certificate and determining that the user is associated with a second digital certificate. The method also includes receiving a validity term for the digital certificate from the user and provisioning the digital certificate with an expiration date equal to the validity term. The method further includes renewing the second digital certificate with an expiration date equal to the validity term.

According to specific embodiments of the present invention, certificate provisioning systems are provided. The certificate provisioning systems include a data processor, a communications module (including a receiver and a transmitter) coupled to the data processor, and a computer readable medium coupled to the data processor. The computer readable medium stores a plurality of instructions for performing the methods of the present invention. The plurality of instructions include instructions that cause the data processor to perform the elements of the various methods described herein. One of ordinary skill in the art would recognize many variations, modifications, and alternatives.

Numerous benefits are achieved by way of the present invention over conventional techniques. For example, embodiments of the present invention provide an owner of digital certificates with increased flexibility in managing their digital certificates. By allowing the certificate owner to establish common validity end dates for their certificates, the workload associated with renewing and replacing the certificates is reduced. Thus, embodiments of the present invention reduce the administrative burden for certificate owners and managers. These and other embodiments of the invention along with many of its advantages and features are described in more detail in conjunction with the text below and attached figures.

DETAILED DESCRIPTION OF SPECIFIC EMBODIMENTS

Figure 1:
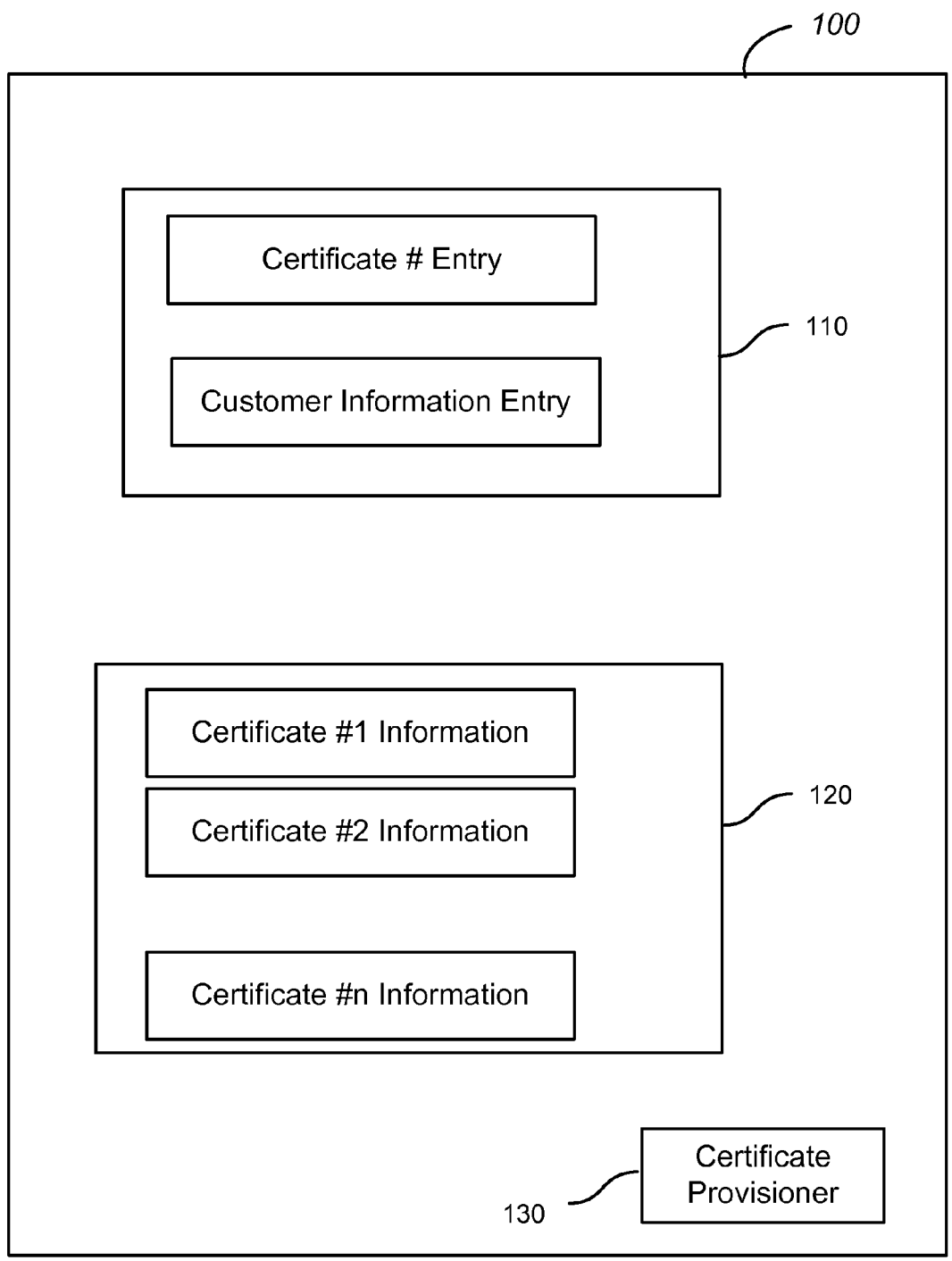
FIG. 1 is a simplified illustration of a user interface for a certificate management system according to an embodiment of the present invention.

Because of the widespread use of digital certificates in ecommerce, a certificate owner, also referred to as a customer or a user, may accumulate several certificates. In general, each of the certificates will have different validity start and end dates. A customer with a large number of certificates will typically have to go through the certificate renewal and replacement process frequently. Typically, a CA will notify certificate users approximately 90 days before the validity end date of a certificate as a reminder to the user to renew the certificate. Although such a reminder is helpful, a more convenient system would provide users with the ability to renew and replace one or more of their certificates at the same time. According to embodiments of the present invention, the workload associated with certificate maintenance can be planned, scheduled, and performed in a reduced time, thereby providing the user with a more flexible certificate management system.

Embodiments of the present invention relate to methods and systems that can be offered by a CA to enable certificate purchasers and users to more easily manage their portfolio of certificates. The certificate management system described herein enables enable certificate users with multiple certificates to select two or more certificates with differing validity end dates and renew the certificates so that they have a similar (e.g., simultaneous) end date. In some implementations, this is referred to as simultaneous expiration of the digital certificates. Embodiments of the present invention enable certificate users to perform their certificate renewals in a short time period, for example, at the same time (rather than one by one over time), decreasing the inconvenience typically experienced when multiple certificates are replaced at differing times throughout the year. Costs associated with extensions or changes in certificate term associated with the multiple certificate renewal process can be prorated to the user.

Another embodiment of the present invention incorporates the concept of simultaneous expiration into the new certificate purchase process. The certificate management system will identify the validity end date selected by a user and when a user enrolls a new certificate, the user has the option to have the new certificate's validity end date set to the same validity end date as the user's other certificates. The cost of the new certificate would be prorated to reflect the term of the validity period. As described more fully throughout the present specification, the use of the term simultaneous herein is not limited to a definition of exactly coincident, but is broader to include expiration dates that expire within a close range of each other, for example, a day, a week, or a month.

The certificate provisioning process includes steps of a user choosing a certificate type and the validity period among other options. The user then generates a CSR, which provides information from the user's server that the CA uses in the certificate provisioning process. The user also provides information on their contacts. Based on the validity period that that user chooses, a start date and an end date are assigned to the certificate. In some implementations, the start date does not start until the day that the CA issues the certificate. That is, the validity date is set when the certificate is issued, but not before, thereby ensuring that the customer only pays for the time they actually use the certificate and are not charged for the time used in the certificate issuance process. After the user information is collected, the CA conducts an authentication and verification process and the day the CA issues the certificate, the validity period starts. This process is utilized since there may be a time period between the information collection phase and the completion of the authentication and verification process. The start date and the end date for an issued certificate is readily available, for example, by clicking on the seal displayed on a web page provided by the SSL server associated with the certificate or other appropriate functionality in the user's browser.

The certificate provisioning process provides the functionality of both buying the certificate and managing the certificate. During the purchase process, the user can add various features, select validity dates, and the like. Additionally, after the certificate is purchased, a management console is provided that enables the certificate owner to view all the user's different certificates, buy new ones, renew existing certificates, upgrade, add features, and the like. According to embodiments of the present invention, the user is also able to modify validity end dates so that multiple certificates will coterminate as described more fully throughout the present specification. As an example, during enrollment, the CA will perform a search to determine other certificates owned by the user. The customer will then have the opportunity to have the various certificates coterminate as discussed in additional detail in relation to FIG. 5.

FIG. 1 is a simplified illustration of a user interface for a certificate management system according to an embodiment of the present invention. The user interface 100 includes a data entry area 110 and a data output area 120. The data entry area 110 includes regions for a user to enter certificate information, customer information, and the like. As an example, the data entry area 110 can provide a log-in interface that will enable a user to log into an account with the CA. The CA will then be able to determine the other certificates owned by the user. Information on the various certificates owned by the user can be displayed in the data output area 120. Alternatively, the user can enter a domain name, a certificate number, and/or verification information that will enable the CA to identify the user. Other suitable types of user interface can receive other kinds of kind of customer information data entry.

Referring to FIG. 1, the data output area 120 provides an interface that enables a user to view information related to their current certificates, including the date at which the validity of the various certificates ends. The certificate information may be displayed in a notecard format or in a table as appropriate to the particular application. As an example, the table could list the certificates and the validity end dates in columns. A check box could be provided to enable a user to select multiple certificates for cotermination as described more fully throughout the present specification.

In a particular embodiment, the user interface 100 will include a log-in screen so that a user can log into their account with the CA. After logging in, the management console will provide access to display and control of the various certificates owned by the user. Once a user logs in, the processes for renewing, upgrading, buying additional certificates, and the like, are simplified since certain steps can be skipped or information can be prefilled in forms based on the user's current account information. In another embodiment, the user interface 100, also referred to as a certificate management console, can provide a top half and a bottom half. In the top half, the certificates can be listed in rows, with one or more rows provided for each certificate. The bottom half provides information, for example, in tabs, related to a particular certificate selected in the top half. Thus, a user could select various certificates from the list in the top half, by using a series of check boxes, to indicate a desire to co-terminate these certificates. Referring to FIG. 1, user input device 130 is used to initiate the certificate provisioner, which provides the functionality of buying, renewing, or updating certificates.

The user interface provides a mechanism for the user to select one or more of the certificates listed in the data output area 120, typically using a mouse or other user input device. An option to select all the certificates owned by the user could also be provided. As described more fully throughout the present specification, certificates are selected in order to enable the user to adjust the validity end dates of the certificates to decrease the time gaps between the expiration dates of the various certificates.

Figure 2:
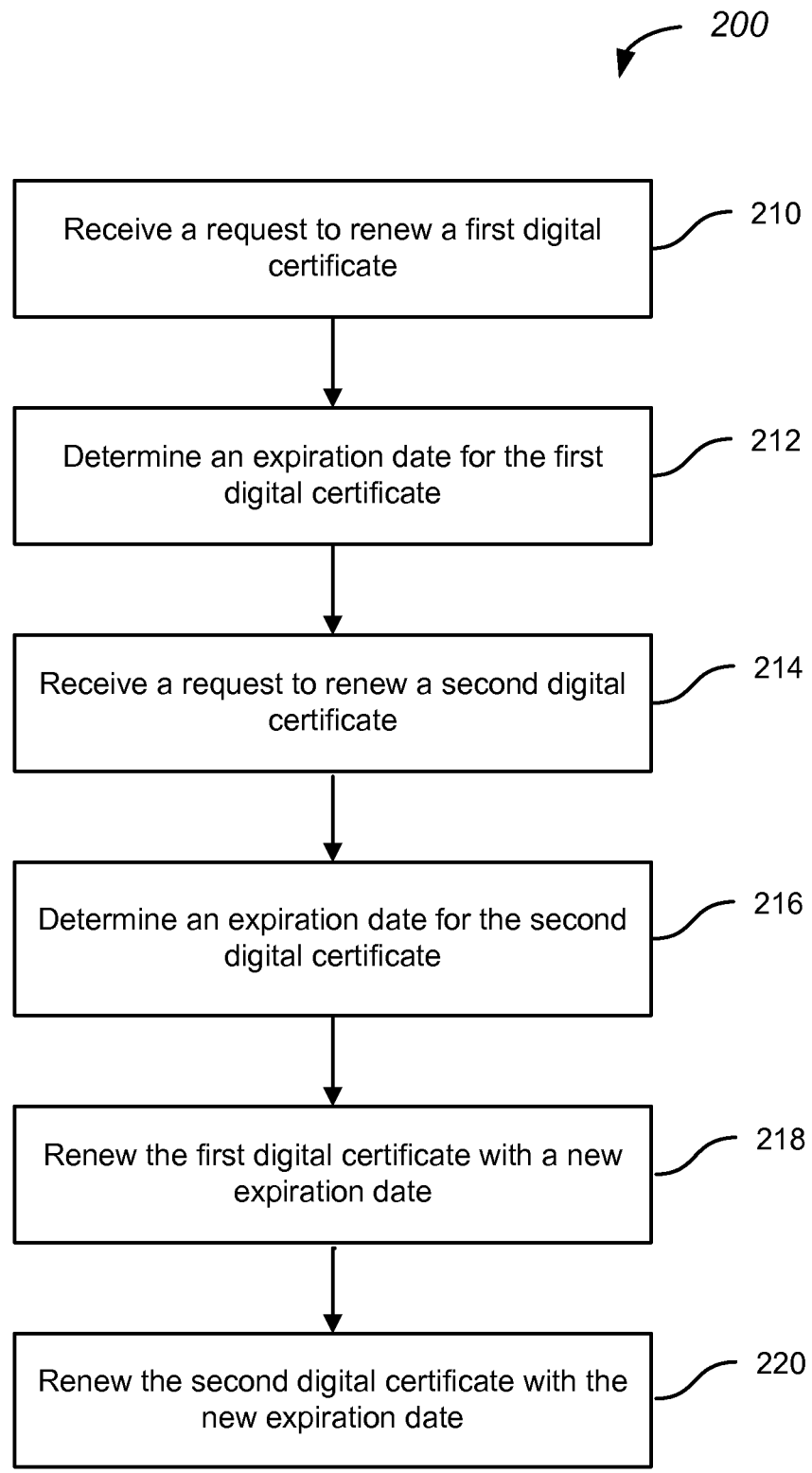
FIG. 2 is a simplified flowchart illustrating a method of renewing multiple digital certificates having a common expiration date according to an embodiment of the present invention.

FIG. 2 is a simplified flowchart illustrating a method of renewing multiple digital certificates using a common expiration date according to an embodiment of the present invention. The method 200 includes receiving a request from a user to renew a first digital certificate (210). The request is typically received through the user interface illustrated in FIG. 1, which provides an interface through which the user can view all their current certificates, including the dates at which the validity of the various certificates end. As an example, referring to FIG. 1, the user may enter user information in data input area 110 and the information related to the certificates owned by the user will be displayed in data output area 120. Typically, the user's identity information will be stored in the subject field of the first digital certificate. In other embodiments, the user's identity information is stored in the SubjectAltName extension of the first digital certificate. Embodiments of the present invention are applicable to a wide range of digital certificates offered by a CA, including certificates of different types.

In an embodiment, a table is presented to the user that lists the certificates owned by the user and the information related to the various certificates, with one certificate per row. In other embodiments, each certificate is displayed as a hyperlink, which is linked to the certificate information, which can be displayed in the data output area 120, in another window created in response to following the hyperlink, or the like. The example discussed in relation to FIG. 2 is for a customer with several certificates, but the invention is not limited to this small number of certificates. Embodiments of the present invention are applicable to customers who are associated with many and even thousands of certificates (i.e., enterprise customers). For these enterprise customers, the user interface may be modified to provide services associated with managing a large number of certificates. The request to renew the first digital certificate is received at a first time and the request to renew the second digital certificate is received at a second time. In an embodiment, the first time and the second time are a same time. An expiration date for the first digital certificate is determined (212), typically by accessing a certificate database stored in memory 612, which is described more fully below. The expiration date of the first digital certificate is stored as the notAfter date of the validity field of the first digital certificate and can be determined by data processor 610, which is also described more fully below. The expiration date for the first digital certificate can be displayed along with other certificate information as appropriate to the particular application.

A request to renew a second digital certificate is received from the user (214) and an expiration date for the second digital certificate is determined (216). Typically, the user's identity information will be stored in the subject field of the second digital certificate. In other embodiments, the user's identity information is stored in the SubjectAltName extension of the second digital certificate. In this embodiment, there is a single user for both certificates, but multiple users (e.g., two subsidiaries of a company) are included within the scope of the present invention. The expiration date of the second digital certificate is stored as the notAfter date of the validity field of the second digital certificate and can be determined by data processor 610. In an embodiment, the request to renew the first and second digital certificates is received as the user selects two or more certificates that are displayed in the user interface. The selection can be performed sequentially as the user reviews the various certificates. In another embodiment, the requests to renew the first and second digital certificate are received at the same time as the user performs an action similar to a "Select All" action, selecting multiple certificates simultaneously. The expiration date for the second certificate is later than the expiration date for the first certificate.

In a particular embodiment, the user then selects a validity end date (i.e., a new expiration date) that is between the current time and the earliest validity end date of all selected certificates. In other words, the new expiration date is after the time at which the requests are received and is on or before the expiration date for the first certificate. In a specific embodiment, the new expiration date is equal to the expiration date for the first certificate. The first and second digital certificates are then renewed, with a common date (i.e., the new expiration date) as the validity end date for both of the certificates (218, 200). Thus, embodiments of the present invention provide a certificate management system in which an owner's various digital certificates can be renewed with simultaneous validity end dates.

In another embodiment, the user selects a validity end date (i.e., the new expiration date) that is between the current time and the latest validity end date of all selected certificates. In other words, the new expiration date is after the time at which the requests are received and is on or before the expiration date for the certificate expiring the farthest in the future. In a specific embodiment, the new expiration date is equal to the expiration date for the second certificate. The first and second digital certificates are then renewed, with a common date (i.e., the new expiration date) as the validity end date for both of the certificates. In this embodiment, the first certificate is renewed for a period longer than the second certificate. The cost of the certificates will be adjusted depending on the length of the renewal period.

In yet another embodiment, the user selects a validity end date that is after the validity end date of all selected certificates. As an example, if the first certificate were expiring in 6 months and the second certificate were expiring in 9 months, the user could select a validity end date one year in the future, renewing the first certificate with a period of 6 additional months and the second certificate with a period of 3 additional months. One of ordinary skill in the art would recognize many variations, modifications, and alternatives.

According to an embodiment of the present invention, a renewal window is associated with the certificates, for example, 90 days prior to the certificate validity end date. Thus, customers are able to initiate renewal three months ahead of the certificate expiration. Prior to the three-month window, a renewal may be referred to as a certificate upgrade due to the remaining term left on the certificate. For a certificate renewed at the beginning of the renewal window, the new certificate could be issued as a 15 month certificate, equal to the amount of time left on the original certificate plus the one year term of the renewal. Similar logic can be applied to coterminating certificates. When a user buys a new certificate, renews one or more existing certificates, upgrades one or more certificates, an option is presented to terminate the certificates at the same time, that is, to coterminate one or more of the certificates. As an example, if the 15 month certificate is to be extended to coterminate with a certificate expiring in 16 months, the cost of the extended certificate can be prorated to add the additional month of cost (15 months to 16 months) and a 16 month certificate could be issued so that the certificates coterminate.

It should be appreciated that the specific steps illustrated in FIG. 2 provide a particular method of renewing multiple digital certificates using a common expiration date according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 3A:
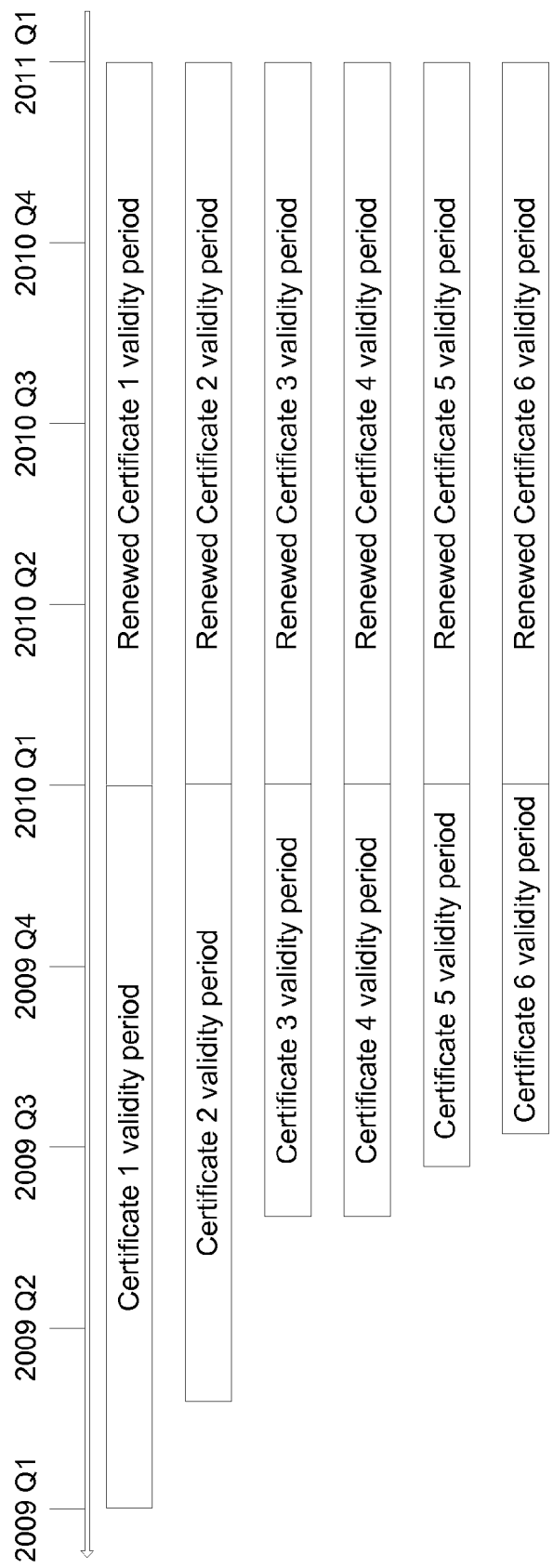
FIG. 3A is a simplified timeline illustrating common validity end dates for multiple digital certificates according to an embodiment of the present invention.

FIG. 3A is a simplified timeline illustrating common validity end dates for multiple digital certificates according to an embodiment of the present invention. As illustrated in FIG. 3A, a user has six digital certificates that are initially expiring at various times during 2010. In order to ease the administrative burden associated with managing these six certificates, the user renews the certificates to expire in 2010 Q1. All six certificates thus have a common expiration date and will be renewed in 2010 Q1 for a shared period of one year. Thus, in 2010 Q1, the user is able to renew and replace all the certificates at the same time so that the certificates have common expiration dates going forward. Although embodiments of the present invention are discussed in terms of a common or simultaneous validity end date, this terminology includes validity end dates that are close to each other although not exactly coincident. In the multiple certificate renewal process illustrated in FIG. 3A, it is not necessary that all six certificates expire on the exact same day. If the certificates expire within several days, a week, or such, the benefits of the present invention are provided and thus, expiration within a range of dates is also included within the scope of the present invention. One of ordinary skill in the art would recognize many variations, modifications, and alternatives.

Figure 3B:
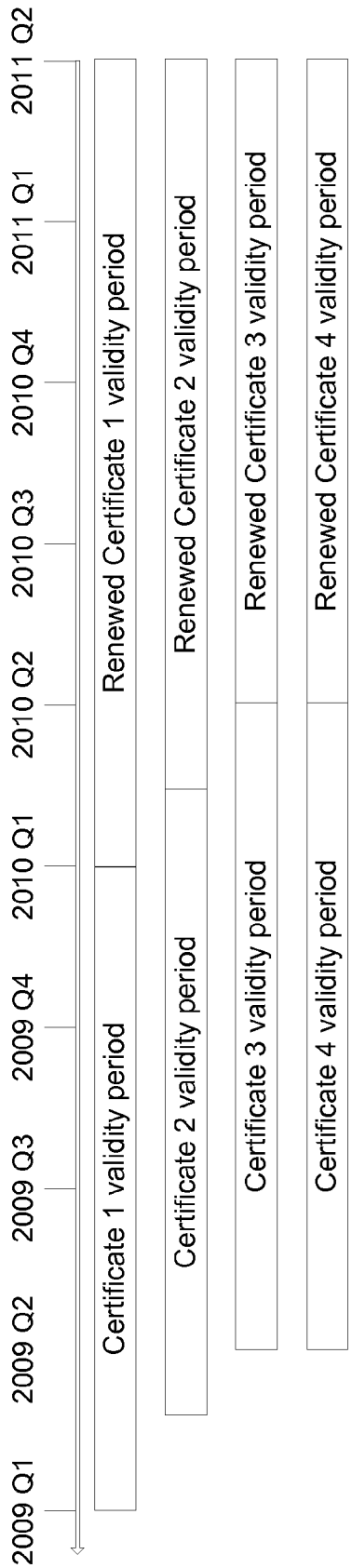
FIG. 3B is a simplified timeline illustrating common validity end dates for multiple digital certificates according to another embodiment of the present invention.

FIG. 3B is a simplified timeline illustrating common validity end dates for multiple digital certificates according to another embodiment of the present invention. In the embodiment illustrated in FIG. 3B, the term of the renewed certificate 1 is greater than the typical one year period. Likewise, the term of the renewed certificate 2 is greater than the typical one year period. Certificates 3 and 4, which have a one year validity period are renewed for an additional year. The expiration dates of the renewed certificates are set at a common value.

The example illustrated in FIG. 3B shows how a customer with a certificate that expires at a first time (e.g., 2010 Q1) and a certificate that expires at a second time (e.g., 2010 Q2)

can renew both certificates to have a common expiration date. For the first certificate, the term of the renewed certificate will be greater than the term of the second renewed certificate.

For the certificates that are renewed early, the time left on the original certificate is added to the renewed certificate that replaces the original certificate. Thus, the customer in this example never loses time. The customers are not short changed in the certificate renewal process, but provided with a benefit of concurrent validity periods while receiving the benefits of the validity period of the original certificate. Referring to FIG. 3B, the term of the renewed certificate 1 is extended in comparison with other renewed certificates in order to ensure the certificate is always valid while still expiring along with the other certificates.

As an alternative to the certificate renewal process illustrated in FIG. 3B, the original certificate 1 could have been extended to the second quarter of 2010 and the renewed certificate 1 could then have a one year validity period. Thus, combinations of extending the original certificate, renewing the certificate with a longer than usual period, or the like are included within the scope of the present invention.

As another alternative to provide certificates with common expiration dates, a short-term certificate could be offered to fill in time gaps between the expiration date of the original certificate and the start date of the renewed certificate. Referring to FIG. 3B a short-term certificate with a validity period of about 3 months could be offered in conjunction with a renewed certificate 1 with a validity period of one year in order to renew certificate 1 and still provide an expiration date generally aligned with the other certificates.

In other embodiments, the new expiration date for the renewed certificates is after the expiration date of one or more of the digital certificates. In these embodiments, the expiration date of first digital certificate is extended by a predetermined time period. For example, if the first digital certificate were to expire in 9 months and the second digital certificate were to expire in 12 months, both certificates could be renewed so that they expired in 12 months. In this embodiment, the older certificate (i.e., the first certificate) would then expire at the same time as the newer certificate (i.e., the second certificate). The cost for the extra term of the first certificate would be assessed. Thus, embodiments of the present invention provide methods and systems to renew digital certificates with common expiration dates that are within the current validity dates for the various certificates or later than the current validity dates for the various certificates. In another particular embodiment, the term of one certificate is traded for the term of another certificate, with the term of the first certificate being extended, for example, by three months and the term of the second certificate being shortened by the same period of three months. Other variations of extending term, reducing term, pro-rating the unused portion of a certificate's life, and the like, are within the scope of the present invention.

In one implementation, the certificate management system will provide a reminder to the user in advance of the common validity end date so that the user can initiate the renewal process prior to the validity end date. In renewing the certificates, which already have a common validity end date, the renewal process for the certificates will also utilize a common validity end date a given time period in the future (e.g., one year, two years, three years, or the like). Thus, when certificates are renewed using embodiments of the present invention, the renewed certificates will have a common validity end date, reducing the administrative burden on the certificate owner/manager.

Figure 4:
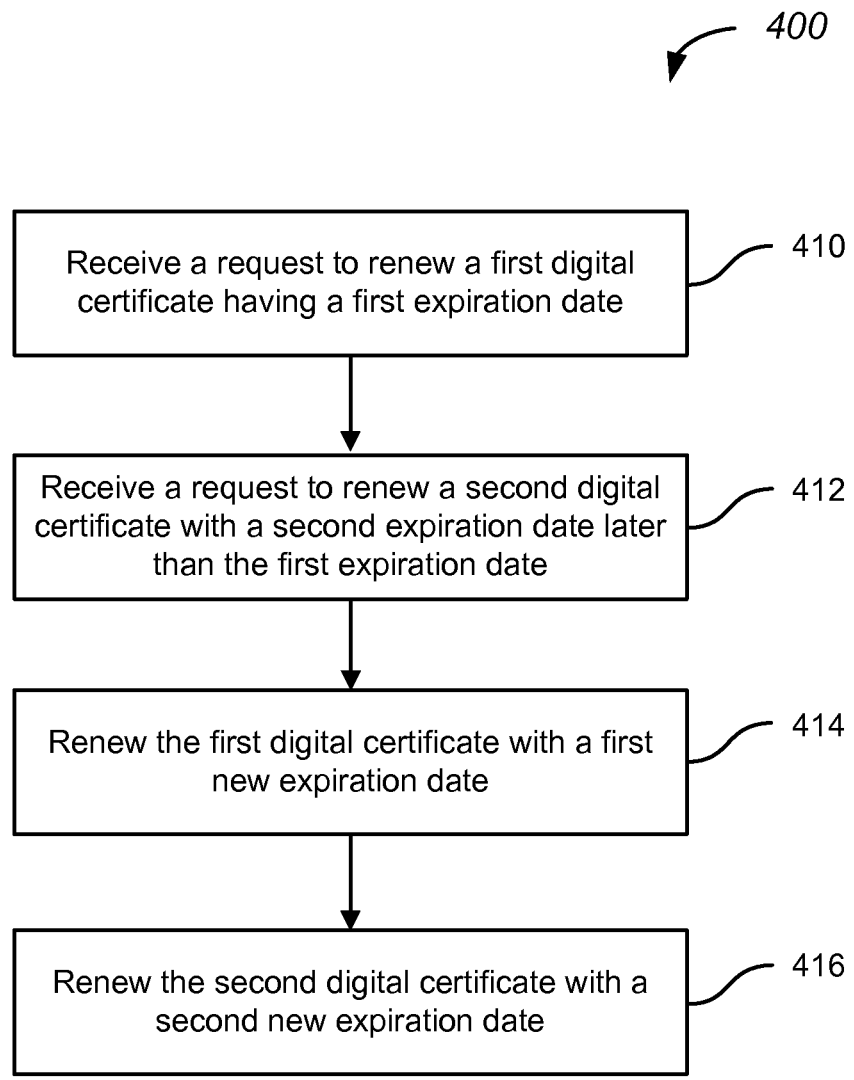
FIG. 4 is a simplified flowchart illustrating a method of renewing multiple digital certificates according to another embodiment of the present invention.

FIG. 4 is a simplified flowchart illustrating a method of renewing multiple digital certificates according to another embodiment of the present invention. The method 400 includes receiving a request from a user to renew a first digital certificate having a first expiration date (410). As discussed in relation to the method illustrated in FIG. 2, the user's identify information is stored in either the Subject field or the SubjectAltName extension of the first digital certificate. The first expiration date is stored in the notAfter field of the first digital certificate. In an embodiment, the request to renew the first digital certificate is received through a web site operated by the CA that will renew the first digital certificate. Depending on the implementation, a user's account information will include a listing of the digital certificates owned by the particular user, which can be displayed on a user interface as illustrated in FIG. 1.

The method also includes receiving a request from the user to renew a second digital certificate having a second expiration date later than the first expiration date (412). The requests to renew the first and second digital certificates can be received sequentially or concurrently. The second digital certificate has a portion of its term that extends beyond the expiration date of the first digital certificate. Thus, a user typically has to renew these two certificates at different times during the year. The CA renews the first digital certificate with a first new expiration date (414) and renews the second digital certificate with a second new expiration date (416). The difference between the first expiration date and the second expiration date is greater than a difference between the first new expiration date and the second new expiration date. Thus, utilizing the embodiment of the present invention illustrated in FIG. 4, the user is able to replace the original digital certificates with renewed certificates that expire closer together in time than the original digital certificates. In particular embodiments, the difference between the first new expiration date and the second new expiration date is less than a month, less than a week, or less than a day (i.e., the first new expiration date and the second new expiration date are the same day).

In an embodiment, the first and second new expiration dates are after the first and second expiration dates. In this embodiment, both certificates are renewed for a period extending beyond the original expiration dates. As an example, two one-year certificates could be renewed as two-year certificates with a common expiration date. Other digital certificates can also be renewed along with the two digital certificates used as examples, thus, embodiments of the present invention are not limited to renewing only two certificates, but can be used to renew more than two digital certificates for the user. Moreover, although a single user is illustrated in the method 400, other users could also utilize embodiments of the present invention to renew and replace multiple digital certificates with a common or close expiration date. Thus, a company with several subsidiaries could renew one or more digital certificates for the subsidiaries using the processes described herein, resulting in certificates owned by different users, but having the same or similar expiration dates. Referring to FIG. 3A, certificates 1-3 could have a first user (e.g., subsidiary A) and certificates 4-6 could have a second user (e.g., subsidiary B). Thus, the company would be able to reduce the administrative burden on the certificate manager for the company.

In another embodiment, one or both of the first and second new expiration dates are after the first expiration date and the second expiration date. As an example, the first certificate could expire in 6 months and the second certificate could expire in 9 months. Both certificates could be renewed with an expiration date 18 months in the future, with the first certificate being renewed, adding 12 months to the unused term and the second certificate being renewed, adding 9 months to the unused term.

In yet another embodiment, one or both of the first and second new expiration dates are before the first expiration date or the second expiration date. In this embodiment, one or more of the certificates are renewed for a period shorter than the original expiration date for that certificate. As an example, a first certificate expiring in 2 months and a second certificate expiring in 11 months could be renewed with a common expiration date 8 months in the future. The cost for the 6 month extension of the first certificate could be offset by the 3 months of term reduction for the second certificate. A user might utilize this exemplary method to align the certificate expiration dates with the end of the calendar year, the end of a company's fiscal year, a budgeting cycle, to a maintenance window (i.e., a planned period of non-operation where maintenance activities like certificate installation are performed), or the like.

It should be appreciated that the specific steps illustrated in FIG. 4 provide a particular method of renewing multiple digital certificates according to another embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
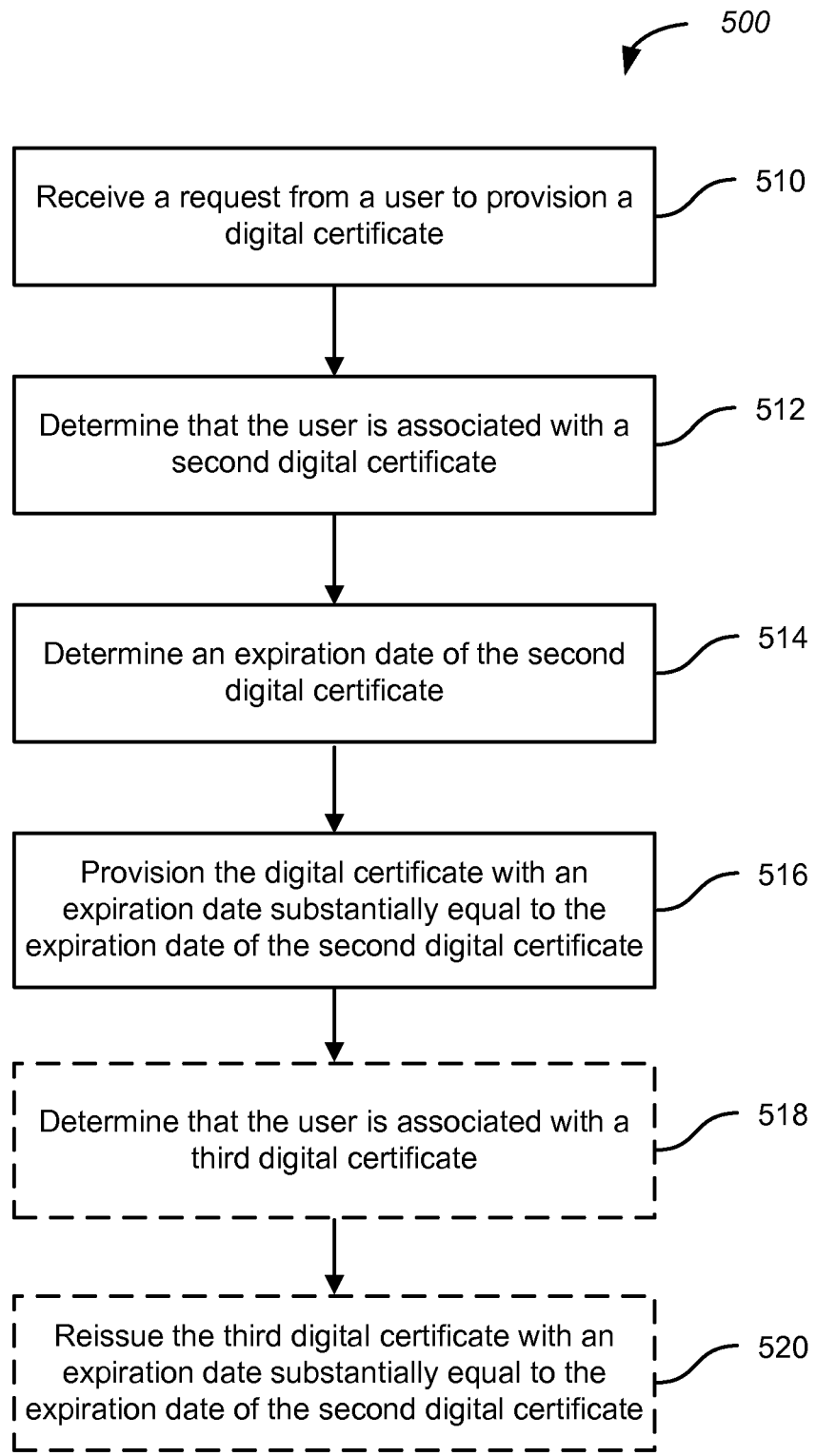
FIG. 5 is a simplified flowchart illustrating a method of provisioning a new digital certificate according to an embodiment of the present invention.

FIG. 5 is a simplified flowchart illustrating a method of provisioning a new digital certificate according to an embodiment of the present invention. The method 500 includes receiving a request from a user to provision a new digital certificate (510). The request can be initiated through the website of a CA or otherwise. In a typical implementation, the user will submit a CSR to the CA. In other embodiments, the CSR from one of the customer's existing (e.g., the second certificate discussed below) will be utilized. Depending on the particular situation, a new CSR may be utilized or required. For example, some systems require that a new CSR is provided for each new certificate. In another example, if it is desirable to increase the length of the key used in generating the CSR, a new CSR could be required. Typically, if the renewal period is shorter, there is less likelihood of a new CSR being requested.

A determination is made that the user is associated with an existing digital certificate (512). The certificate management system will determine an expiration date for the existing digital certificate (514). As described above, the expiration date for the existing digital certificate will be stored in the notAfter field of the certificate. Using the expiration date for the existing digital certificate, the certificate management system will provision the new digital certificate with an expiration date substantially equal to the expiration date of the existing digital certificate (516). As examples, the expiration date of the new digital certificate can be within a week of the expiration date of the existing digital certificate, within a day of the expiration date of the second digital certificate, or the like. In some embodiments, information from the existing digital certificate (e.g., the identity of the user from the Subject field of the existing digital certificate) can be used in provisioning the new digital certificate.

In an exemplary implementation, the new digital certificate will have a validity period less than other certificates that are not provisioned to expire at substantially the same time as other certificates. Thus, the price charged to the user for provisioning of the certificate may be reduced in comparison with a "full term" certificate. At the same time, because of the convenience provided to the user, a premium may be charged for provisioning of the new certificate so that is expires along other certificates owned by the user. Thus, the pricing model will be adjusted to the particular application.

In an alternative embodiment, method 500 also includes determining that the user is associated with a third digital certificate (518) and reissuing the third digital certificate with an expiration date substantially equal to the expiration date of the second digital certificate (520). Thus, embodiments of the present invention are not limited to provisioning only two certificates with similar expiration dates, but can provision more than two certificates using the methods described herein. Thus, for certificate owners with a large portfolio of certificates, the present invention provides benefits including a reduction in administrative overhead and the like.

According to an embodiment of the present invention, the certificate management system stores the validity end date for the user's certificates in memory. In the example illustrated in FIG. 5, the validity end date from the existing certificate is stored in memory. When the user requests the provisioning of another new certificate before the stored validity end date, the user is offered an option to provision this certificate using the stored validity end date. Thus, as multiple certificates are provisioned during a period of time, the user is able to synchronize the expiration dates of the various certificates being provisioned. The cost of these new synchronized certificates can be prorated as a function of the validity period or could be priced as a regular certificate in exchange for the convenience of having synchronized certificates. Once the validity end dates for the certificates are synchronized, the certificate owner is free from having to repeat the process until a year later, or two or three years later in some embodiments. One of ordinary skill in the art would recognize many variations, modifications, and alternatives.

In an alternative embodiment, rather than adjusting the new certificate's term to match the existing certificate's term, the existing certificate's term could be adjusted to match the new certificate's term. As an example, if the existing certificate is valid for a period extending 9 months into the future and the user is purchasing a one-year certificate, the existing certificate could be extended for an additional 3 months so that after the purchase, the user has two certificates that expire in one year. One of ordinary skill in the art would recognize many variations, modifications, and alternatives.

It should be appreciated that the specific steps illustrated in FIG. 5 provide a particular method of provisioning a new digital certificate according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

It should be noted that if the life of a certificate is extended, some embodiments of the present invention require that the certificate still have available time associated with the certificate. As an example, it is possible to issue certificates that are issued for a first time period, but are potentially valid for a second period greater than the first period. Additional description related to these "evergreen" certificates is provided in U.S. patent application Ser. No. 12/646,515, filed on Dec. 23, 2009, and entitled "Alternative Approach to Deployment and Payment for Digital Certificates," the disclosure of which is hereby incorporated by reference in its entirety. As an example, a one-year certificate could be purchased that could be good for five years. At the end of the one year term, if the customer wants to renew the certificate, the four years of remaining eligibility will enable the CA to renew the certificate with reduced administrative overhead. Utilizing such evergreen certificates, the process of coterminating certificates is simplified in comparison with conventional certificates since the CA has provided certificates with a current lifetime and a longer potential lifetime.

Moreover, as customers request the provisioning of new certificates, the existing certificates could be extended to expire along with the new certificate. As an example, in another embodiment, a request is received for a new certificate and a determination is made that the customer is associated with a second certificate that is expiring at a predetermined time (e.g., six months in the future). The new certificate is issued with a validity period equal to the time until the expiration of the second certificate plus one year. The expiration date of the second certificate is also increased by a year by issuing a renewed certificate to replace the second certificate with the validity time increased by one year. Thus, the new certificate is issued and the expiration date of the existing certificate is pushed out so that both the new certificate and the existing certificate expire at the same time.

In embodiments in which the term of the second certificate is shortened by the renewal processes described herein, the user can be credited with a prorated amount based on a difference between the new expiration date and the expiration date for the second certificate. As an example, if the second certificate were to expire in 11 months and the new expiration date is such that the term is reduced to 8 months, then an amount equal to 3 months of term could be refunded to the user to account for the portion of the certificate term that was lost during the renewal process. In another embodiment, the funds are not refunded, but used to offset the costs associated with renewing one or more of the certificates renewed during the renewal process.

Figure 6:
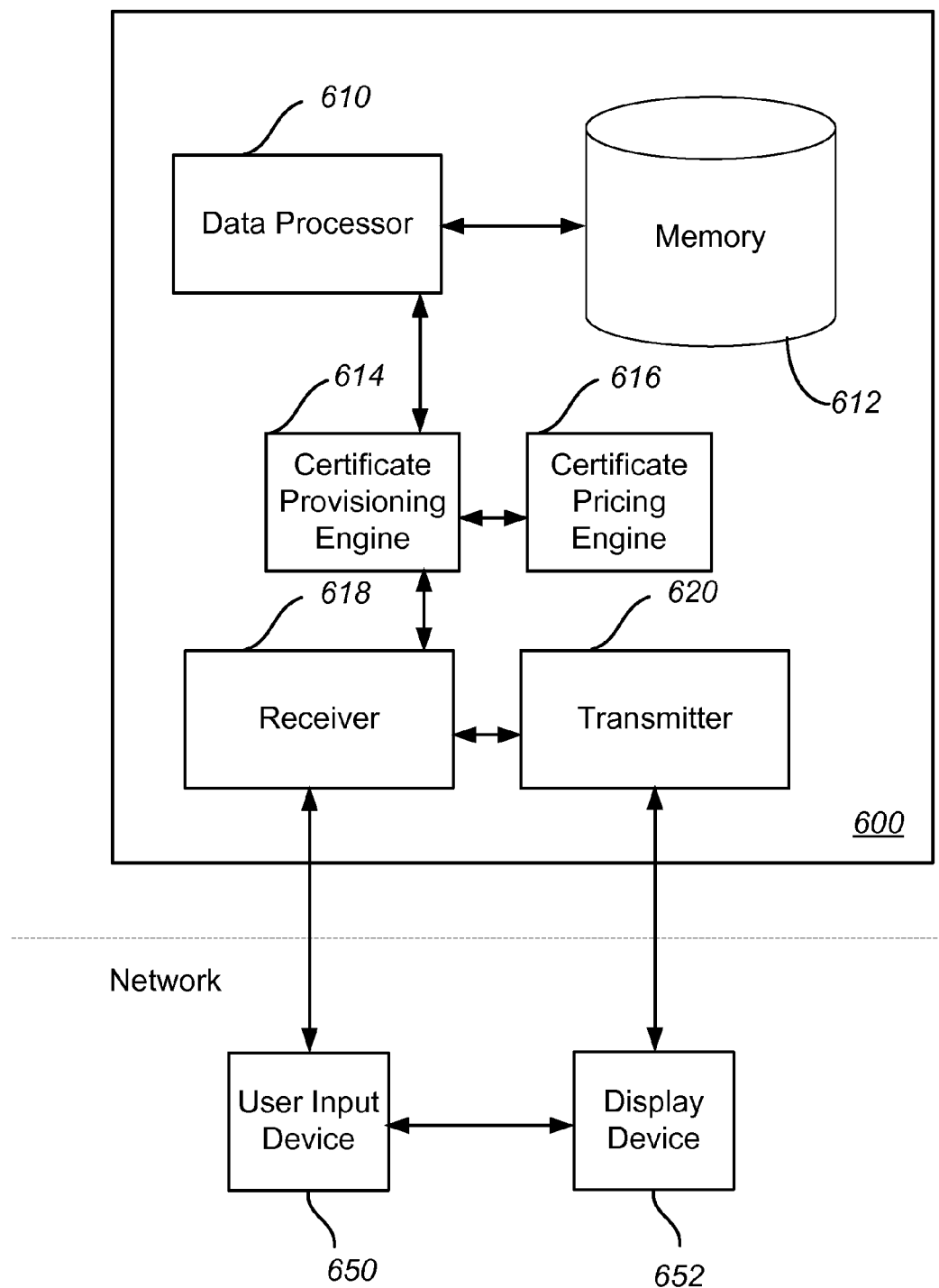
FIG. 6 is a simplified schematic diagram illustrating a certificate management system according to an embodiment of the present invention.

FIG. 6 is a simplified schematic diagram illustrating a certificate management system according to an embodiment of the present invention. The certificate management system is useful for both provisioning and renewal of digital certificates. The certificate management system can also be referred to as a certificate provisioning system. The certificate management system 600 includes a data processor 610 (also referred to as a processor) coupled to a memory 612 (also referred to as a computer readable medium or a database).

The data processor 610 can be a general purpose microprocessor configured to execute instructions and data, such as a Pentium processor manufactured by the Intel Corporation of Santa Clara, Calif. It can also be an Application Specific Integrated Circuit (ASIC) that embodies at least part of the instructions for performing the method in accordance with the present invention in software, firmware and/or hardware. As an example, such data processors include dedicated circuitry, ASICs, combinatorial logic, other programmable processors, combinations thereof, and the like.

The memory 612 can be local or distributed as appropriate to the particular application. The memory can store information related to the certificates issued by the CA, program code and instructions executed by the data processor 610, and other suitable data. In an exemplary embodiment, the memory 612 stores historical records for each certificate issued by the CA including certificate order information, certificate validity dates, and the like.

Memory 612 may include a number of memories including a main random access memory (RAM) for storage of instructions and data during program execution and a read only memory (ROM) in which fixed instructions are stored. Thus, memory 612 provides persistent (non-volatile) storage for program and data files, and may include a hard disk drive, flash memory, a floppy disk drive along with associated removable media, a Compact Disk Read Only Memory (CD-ROM) drive, an optical drive, removable media cartridges, and other like storage media.

The certificate management system 600 also includes a certificate provisioning engine 614 and a certificate pricing engine 616. The certificate provisioning engine is used to provision new certificates, renew existing certificates, and the like. The certificate pricing engine 616 works in concert with the certificate provisioning engine 614 to compute the prices for certificates as a function of the certificate type, the validity period, and the like. As discussed throughout the present specification, the price of the certificate may be prorated based on unused certificate term, increased based on additional term added to a certificate, or the like.

The certificate management system 600 also includes a receiver 618 and a transmitter 620, which can be referred to as a communications module. The receiver 618 and the transmitter 620 are operable to interact with a user input device 650 and a display device 652 over a network. The network can be the Internet or other network suitable for the communication of data and commands. Thus, a customer is able, through a user interface interacting with the user input device 650 and the display device 652 to submit information related to an existing certificate as discussed in step 210 of FIG. 2 and to request that the a new certificate be provisioned as discussed in step 510 of FIG. 5. Additionally, the user input device 650 and the display device 652 can be used to receive CSRs from the user, display certificate information related to existing certificates, including certificate validity periods, receive inputs from the user related to this information, other functions described throughout the specification, and the like. The user input device 650 and the display device 652 can be components of a personal computer, a web application, or the like. Typically, the user will interact with the certificate management system 600 using one or more (GUIs) receiving input through user input device 650 and displaying output through display device 652 as discussed in relation to FIG. 1.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of renewing a plurality of digital certificates, the method comprising:

receiving, at a first time, a request from a user to renew a first digital certificate of the plurality of digital certificates;

determining an original expiration date for the first digital certificate;

receiving, at a second time, a request from the user to renew a second digital certificate of the plurality of digital certificates;

determining an original expiration date for the second digital certificate, wherein the original expiration date for the second certificate is later than the original expiration date for the first certificate;

determining, by a processing device, a new expiration date for the first digital certificate and a new expiration date for the second digital certificate, the new expiration date for the first digital certificate and the new expiration date for the second digital certificate both occurring after the original expiration date for the first digital certificate and the original expiration date for the second digital certificate;

separately renewing the first digital certificate with the new expiration date for the first digital certificate and the second digital certificate with the new expiration date for the second digital certificate for the user, wherein the new expiration date for the renewed first digital certificate and the new expiration date for the renewed second digital certificate are equal to cause the renewed first digital certificate and the renewed second digital certificate to terminate on a same expiration date; and crediting the user with a prorated amount based on a difference between the new expiration date and the original expiration date for the second digital certificate.

2. The method of claim 1 wherein the user is associated with the subject field of the first digital certificate and the second digital certificate.

3. The method of claim 1 wherein the original expiration date for the first digital certificate is stored as the notAfter date of the validity field of the first digital certificate.

4. The method of claim 1 wherein the original expiration date for the second digital certificate is stored as the notAfter date of the validity field of the second digital certificate.

5. The method of claim 1 wherein the first time and the second time are a same time.

6. A method of renewing multiple digital certificates, the method comprising:

receiving a request from a user to renew a first digital certificate having a first expiration date;

receiving a request from the user to renew a second digital certificate having a second expiration date later than the first expiration date;

renewing the first digital certificate with a first new expiration date; and separately renewing the second digital certificate with a second new expiration date, wherein the first new expiration date and the second new expiration date are equal and occur after both the first expiration date and the second expiration date to cause the renewed first digital certificate and the renewed second digital certificate to terminate on a same expiration date; and crediting the user with a prorated amount based on a difference between the new expiration date and the original expiration date for the second digital certificate.

7. The method of claim 6 wherein the user is associated with the subject field of the first digital certificate and the subject field of the second digital certificate.

8. The method of claim 6 wherein renewing the first digital certificate and renewing the second digital certificate is performed by a certificate authority.

9. The method of claim 8 wherein the request from the user to renew the first digital certificate and the request from the user to renew the second digital certificate are received through a web site of the certificate authority.

10. A method comprising:

receiving a request from a user to provision a first digital certificate;

determining that the user is associated with a second digital certificate;

determining an original expiration date for the second digital certificate;

renewing the second digital certificate with a new expiration date occurring after the original expiration date; and separately provisioning the first digital certificate with an expiration date equal to the new expiration date of the second digital certificate to cause the first digital certificate and the second digital certificate to terminate on a same expiration date; and crediting the user with a prorated amount based on a difference between the new expiration date and the original expiration date for the second digital certificate.

11. The method of claim 10 further comprising:

determining that the user is associated with a third digital certificate; and reissuing the third digital certificate with an expiration date substantially equal to the new expiration date of the second digital certificate.

12. The method of claim 10 wherein an identity of the user is associated with a subject field of the second digital certificate.

13. A method comprising:

receiving a request from a user to provision a first digital certificate;

determining that the user is associated with a second digital certificate having an original expiration date;

receiving a validity term for the first digital certificate from the user;

provisioning the first digital certificate with an expiration date equal to the validity term; and separately renewing the second digital certificate with a new expiration date equal to the validity term, the new expiration date occurring after the original expiration date, to cause the first digital certificate and the second digital certificate to terminate on a same expiration date; and crediting the user with a prorated amount based on a difference between the new expiration date and the original expiration date for the second digital certificate.

14. The method of claim 13 further comprising:

determining that the user is associated with a third digital certificate; and renewing the third digital certificate with an expiration date equal to the validity term.

15. The method of claim 13 wherein the validity term is at least one of a year, two years, or three years.

16. The method of claim 13 wherein an identity of the user is associated with a subject field of the second digital certificate.

\* \* \* \* \*